Figure 1:
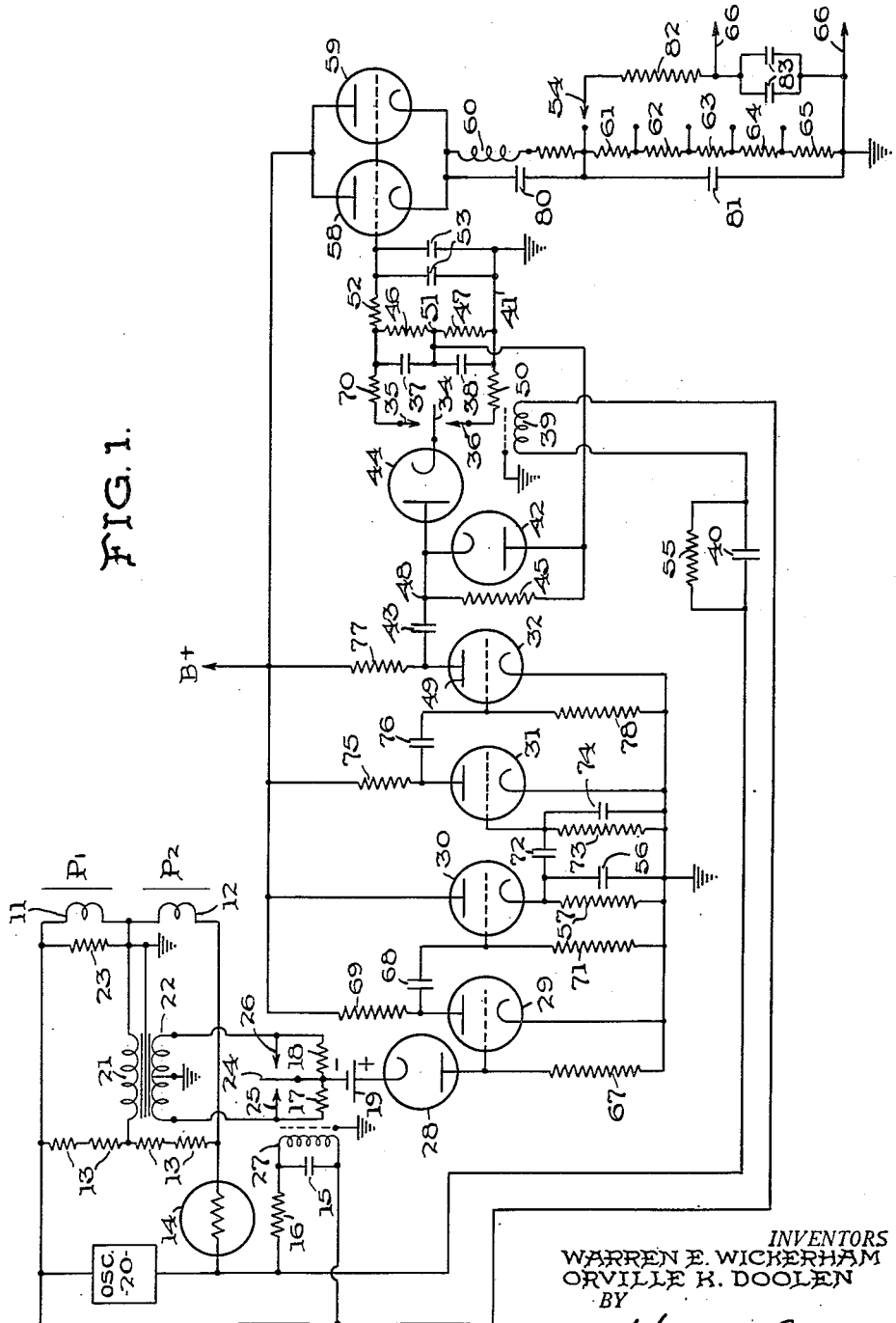

*INVENTORS*
WARREN E. WICKERHAM
ORVILLE K. DOOLEN
BY

THEIR ATTORNEY

United States Patent Office 2,809,345
Patented Oct. 8, 1957

2,809,345

INDICATING CIRCUIT FOR FLUX-VALVES

Warren E. Wickerham and Orville K. Doolen, Penn Township, Allegheny County, Pa., assignors to Gulf Research & Development Company, Pittsburgh, Pa., a corporation of Delaware Application May 28, 1952, Serial No. 290,502

5 Claims. (Cl. 324—43)

This invention concerns apparatus useful in measuring intensity of magnetic fields and in particular concerns an indicating circuit for a flux-valve type of magnetic detector.

Various devices are used in measuring and indicating the intensity of magnetic fields, the well-known flux-valve being one such device. Such flux-valves are shown for example in Vacquier Patent 2,406,870 and Schmitt Patent 2,560,132. These devices have been found to be especially useful in measuring the terrestrial field intensity in an airplane which can rapidly traverse an area over which the terrestrial magnetic intensity may be of interest for purposes of magnetic prospecting as is well known in the art.

There are certain difficulties associated with the use and operation of flux-valves, one of these being drift of the indication with time. This is due to many causes. The effect manifests itself in that the indication of the apparatus will slowly and very gradually change during operation even through no change in the magnetic field at the flux-valve takes place. Among the contributory causes of this drift have been found temperature changes, supply-voltage variations, mechanical strains on the flux-valve cores, and many others. Some of these may be eliminated more or less completely by appropriate measures, while other causes persist. One source of drift which is difficult to avoid is change in voltage or frequency of the flux-valve-exciting oscillator.

Schmitt Patent 2,560,132 shows one way of reducing this source of trouble in which one of the flux-valve coils is shunted by an impedance to unbalance the elements and cause alternate pips or pulses to be of opposite polarity rather than of the same polarity. Changes of field then cause one set of pips to increase in amplitude while the alternate pips decrease in amplitude, instead of making all pulses go up and down together, or reverse together as happens when the field reverses. Since the pulses change in opposite senses, it becomes possible to use the difference in pulse amplitudes rather than the average pulse amplitude as the measure of the applied field. This is more reliable, because it largely cancels out drifts due to oscillator amplitude and other spurious effects that change the average pulse height but which have little effect on the difference in amplitude of alternate pulses.

According to the teaching of the Schmitt Patent 2,560,132, a detector-amplifier responds to the difference in the heights of the positive and negative pulses. While the patent discloses no specific apparatus for doing this, one way in which it may be done is by feeding the pulses into a push-pull arrangement in which one side handles one pulse and the other side handles the other pulse with their difference taken at the output. While the Schmitt arrangement is an improvement over older schemes, it still suffers from drifts due to variations in the balance between the two sides of the amplifier. Since either side of the amplifier can respond only to the alternate pulses which it sees as positive, it is not a true push-pull amplifier and each side operates independently. Consequently, any variation in gain of either side of the amplifier causes a drift or change of the flux-valve indication.

One way of circumventing the above-mentioned type of drift is by periodically checking and adjusting the gain of the two sides of the amplifier, either manually or automatically. By careful selection and matching of components, the drift can be minimized to the extent that no readable error could be observed after 12 to 15 minutes of operation. Hence, an automatic apparatus for checking and adjusting the gain every 12 to 15 minutes offers a solution to the drift problem. However, this apparatus has many undesirable features, including added weight and complexity, and the loss of record during the periodic checking and adjusting intervals. The record which is lost during these intervals, though ordinarily not serious, occasionally happens at a tie point where it is important to have the record. Also, the circuits associated with the checking and adjusting mechanism involve a servo system, relay contacts, potentiometers, etc., which are possible sources of trouble requiring continual maintenance. Furthermore, the system requires matched components which are difficult to replace. Taken in its entirety, the system leaves much to be desired.

Accordingly, it is an object of our invention to provide a flux-valve output-indicating apparatus which is free of drift.

Another object of our invention is to provide a flux-valve output-indicating apparatus which eliminates the need for drift-compensating devices.

Another object of our invention is to provide a flux-valve output-indicating apparatus which eliminates the need for repeated checking and adjusting.

Another object of our invention is to provide a flux-valve output-indicating apparatus which maintains its precision over long uninterrupted periods of time.

Another object of our invention is to provide a flux-valve output-indicating apparatus which does not require its components to be critically adjusted or balanced.

Another object of our invention is to provide an improved flux-valve output-indicating circuit which is free from drift due to changes in amplification with time.

Figure 11:
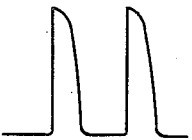
Figure 12:
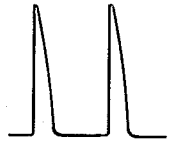
Figure 15:
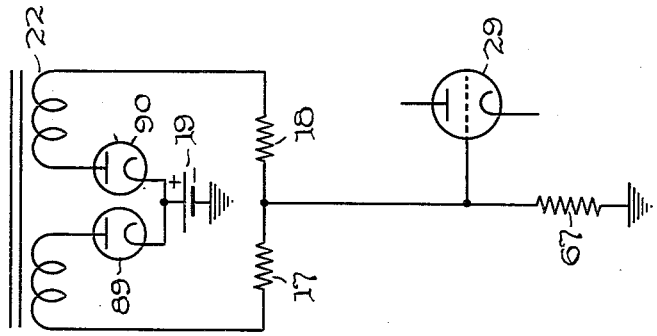
Figure 14:
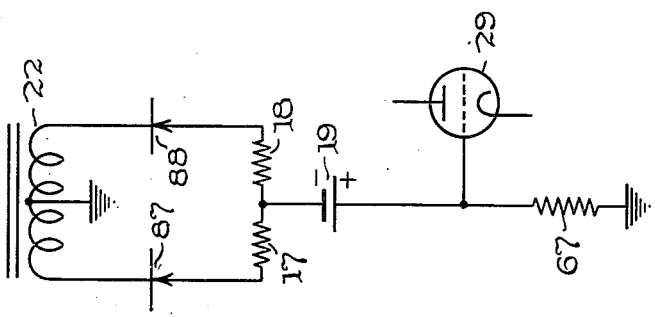
Figure 13:
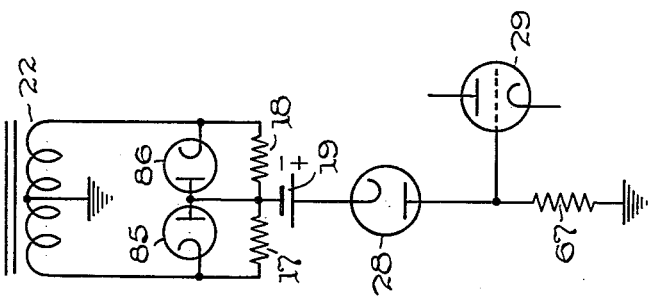

These and other useful objects of our invention are accomplished by the apparatus described in the following specification, of which the accompanying drawings form a part, and in which Figure 1 is a schematic wiring diagram of our invention;

Figures 2 to 12 inclusive, are representations of the signal wave form at various points in the circuit of Figure 1 as hereinafter explained; and Figures 13, 14, and 15 are schematic wiring diagrams of rectifier circuits which are alternative to a portion of Figure 1.

In the present invention, the prior art difficulties are surmounted by using a single-channel amplifier to amplify both pulses equally. To do this, it is necessary to reverse the polarity of one of the sets of alternate pulses so that both sets will be handled on the same polarity basis, either both positive or both negative. In this manner, any change in the amplifier characteristic will affect both sets of pulses equally, and some other inequalities, such as might be caused by phase or frequency variations, should tend to cancel out. The reversal of polarity of alternate pulses is effected by a synchronous reversing switch which reverses polarity between each pulse and the succeeding one. The switch may be of the usual two-pole, double-throw type with crossed connections between the two pairs of outer contacts, or if the flux-valve output is available in both polarities, as in a push-pull winding, it will suffice to use a single-pole switch to throw the amplifier input alternately from one end to the other of the push-pull winding. The switching function may also be performed with diodes as described later in detail. The resulting output will be alternate pulses of like polarity but, in general, of different amplitude. For most purposes it is desirable to convert this into a proportionate D.-C. value for use in a meter, recorder, or compensating circuit. This is accomplished with a second synchronous switch that sorts out the alternate pulses and delivers them to separate condensers or other circuit elements which will store up their D.-C. components. The two resulting D.-C. components may be combined in opposition to get a D.-C. which is indicative of the amount and direction of the ambient field. Any remaining A.-C. components may be filtered out to any desired degree. Such an arrangement may be called a differential filter, since it produces a D.-C. proportional to the difference of two rectified components.

In one form of this apparatus, the D.-C. output of the differential filter may be used to control a field-compensating current. This current is fed back to a coil on the flux-valve so wound that the ambient field value is approximately cancelled out, leaving only enough residual field at the element to generate the required compensating current. The compensating current is then proportional to the magnetic field, although it must always be slightly less than the exact equivalent. The system possesses a high degree of inverse feedback and consequently has a high degree of stability. A recorder may record the compensating current as the indication of the magnetic field intensity. Preferably the recorder sensitivity is adjusted so that the scale divisions represent convenient, even values of magnetic field, allowing for the constant of the compensating coil together with the residual field or signal necessary to effect the compensation.

Figure 2:
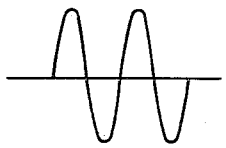
Figure 3:
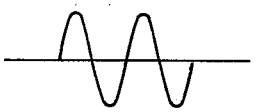
Figure 4:
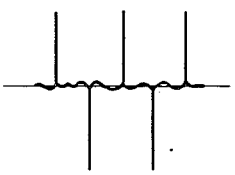
Figure 5:
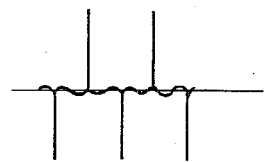

Referring to Figure 1, the elements $P_1$ and $P_2$ are the wound cores of the detecting element or flux-valve. Their respective coils 11 and 12 are connected as arms of a bridge circuit which contains resistors 13 as its other arms. These resistors may, for example, be 60 ohms each, and since two are shown in series in each arm there are 120 ohms per arm. Exciting oscillator 20 provides A.-C. excitation for the coils 11 and 12 of the cores $P_1$ and $P_2$. The output of oscillator 20 may, for example, be sinusoidal as shown in Figure 2, and it may be supplied through a regulator tube 14, which, for example, may be a type D6TK7 Amperite. The regulated sinusoidal excitation is illustrated in Figure 3 and is applied across one diagonal of the bridge circuit. The output of the bridge appears across transformer primary 21. The secondary 22 of this transformer has a center-tap which is grounded so that the output voltage is available in two polarities at the two ends of winding 22. The output from the two sides of transformer 22 is in the form of sharp pulses illustrated in Figures 4 and 5. The flux-valve element may be deliberately unbalanced, as by resistor 23 shown in parallel with coil 11 of element $P_1$. Resistor 23 is selected to give a reasonable unbalance with the particular elements $P_1$ and $P_2$ employed. As shown in the previously-mentioned Schmitt patent, this causes alternate output-signal pulses to be of opposite polarity, and consequently, if one pulse is negative at the left end of coil 22, the succeeding pulse will be negative at the other end of the coil 22.

The amplifier shown in Figure 1 operates on negative pulses from coil 22, although it could as well be arranged for operation on positive pulses. This is partly a matter of convenience depending on the required number of amplifier stages, although the use of negative pulses has an advantage in that the negative pulses do not tend to cause grid current to flow with resultant loading effect on the element.

Figure 6:

To select the alternate pulses in the negative polarity a synchronous reversing switch is used. This consists of a vibrating reed 24 and contacts 25 and 26. The reed 24 is vibrated in synchronism with the exciting source 20 by means of driving coil 27 connected to oscillator 20. The motion of the reed 24 must be phased so that the left contact is touched while the negative pulse appears at the left end of coil 22 and for a reasonable length of time before and after the pulse to assure that no part of the pulse will be missed. Then when the next pulse appears, it will be negative at the other end of the coil, but the reed 24 will be on the right-hand contact 26 by this time. The condenser 15 and resistor 16 associated with the driving coil 27 are selected to give a suitable value of reed-driving current in coil 27 and may also be used to vary the phasing of the reed motion. Resistors 17 and 18 across the vibrator switch contacts prevent the circuit from being completely open or "floating" as the reed passes from one contact to the other and also serve to provide desirable damping across the transformer secondary 22 to eliminate oscillatory voltages. The resistors 17 and 18 may be one-half megohm each. Figure 6 illustrates the wave form of the output from the synchronous switch 24.

Figure 7:
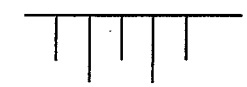

Voltage from the reversing switch or vibrator reaches the amplifier by way of diode 28 and bias battery 19. The diode 28 assures that only negative signals will reach the amplifier and the bias battery 19 requires that the voltage be appreciably negative before the amplifier begins to respond. Thus the diode acts as a clipper in that it clips off all weak signals as well as positive voltages. This eliminates the so-called "hash" or undesirable low-voltage components that appear between the sharp voltage pulses and which contributes nothing to the desired signal. Figure 7 illustrates the clipped signal from tube 28, the elimination of the low voltage hash being apparent by comparison with Figure 6.

Figure 8:
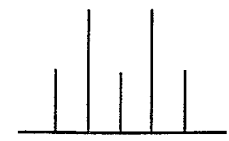
Figure 9:

Tube 29 is the first amplifier. It amplifies the pulses and makes them positive (as shown in Figure 8) at the grid of tube 30, which acts as an infinite impedance detector tube. Tube 30 is biased quite highly through cathode resistor 57 and condenser 56 so that its grid-circuit impedance is extremely high. Each positive pulse at the grid of tube 30, although of extremely short duration, charges the 0.1 microfarad cathode condenser 56 to a voltage approximately the peak pulse voltage. This voltage dies away relatively slowly after each charge because of the small discharging effect of the 1 megohm cathode resistor 57. Hence the pulse is expanded or stretched out over a longer period of time whereby its energy content is greatly increased, although its peak voltage is not. The waveform at this point in the amplifier is in the form of a series of saw teeth and is illustrated in Figure 9. Alternate teeth are generally of different heights corresponding to the heights of the alternate element pips. The following tubes 31 and 32 are regular voltage amplifiers, although in combination with tubes 42 and 44 they distort the wave shape shown in Figure 9 to the form shown in Figure 10. Examples of values which may be used for the components of the amplifier are listed later.

Figure 10:
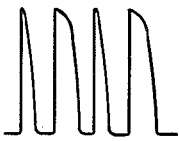

The amplified saw tooth wave of Figure 10 is then rectified. It is desirable to rectify each of the series of alternate pulses separately and then take the difference between the D.-C. component of one series of pulses and the D.-C. component of the series of intervening pulses. This is done in a special circuit comprising two rectifiers 42 and 44, a synchronous switch 34, and a differential filter circuit as will now be described. Rectifiers 42 and 44 are shown as diodes but may be germanium junction-type rectifiers or other rectifiers with high forward-to-backward ratio.

A second synchronous vibrating switch with reed 34 and contacts 35 and 36 serves, in effect, to distribute the amplified pulses alternately to two condensers 37 and 38. The reed 34 is driven in synchronism with the element-exciting voltage by means of driving coil 39 through the parallel combination of condenser 40 and resistor 55 which may be adjusted to assure proper phasing. If the center point 51 between condensers 37 and 38 could be grounded this would be a straight-forward matter. However, to utilize the difference between the D.-C. voltages built up on the two condensers, it is desirable to ground the lower end of the condenser 38 at point 41. This requires the addition of diode 42 and complicates the action of the circuit somewhat as will be seen from the following explanation.

The phasing of the motion of reed 34 is arranged so that when a first pulse occurs at the plate 49 of tube 32, switch arm 34 will be in contact with point 35. Since the pulse is positive-going at the plate of tube 32, a surge of current will pass through condenser 43, diode 44, reed 34, contact 35, resistor 70, condenser 37, and condenser 38 to ground 41. All three of the condensers 43, 37, and 38 will receive equal charges from the pulse and will develop voltages proportional to the charge and inversely proportional to the capacity values. As the positive-going pulse returns toward zero, condenser 38 and 43 discharge through diode 42 and triode 32. Meanwhile, the charge on condenser 37 begins to leak off through resistor 46. Since diode 44 has ceased conducting as the positive pulse approaches zero, nothing happens when contact arm 34 shifts from contact 35 to contact 36. The net result of the preceding events is to leave a positive charge on condenser 37 which then slowly discharges through resistor 46.

When the next pulse makes the plate of diode 44 positive with respect to its cathode, condenser 43 is charged through diode 44, reed 34, contact 36, and resistor 50. After diode 44 again ceases to conduct, point 48 is highly negative due to the charge on condenser 43. This condition causes diode 42 to conduct, thus making point 51 negative and charging condenser 38. Switching while diode 44 is cut off prepares the circuit to receive the next pulse.

It will be noted from the foregoing that the two successive pulses have ended up in charging condensers 37 and 38 oppositely. Figures 11 and 12 show the A.-C. voltages on contacts 35 and 36 where the alternate pulses appear separately. The junction between the condensers becomes quite negative after a number of cycles. The sum of the opposing condenser (37 and 38) voltages may be either positive or negative depending on which set of alternate pulses is greater.

The charges on condensers 37 and 38 cannot be built up fully until many cycles have occurred, because condenser 43 is much smaller than condensers 37 and 38. By analogy one might compare condenser 43 with a cup used to fill two leaky buckets. Condensers 37 and 38 are the buckets and resistors 46 and 47 are the leaks. After many cupfuls are distributed, the buckets reach equilibrium levels, and the comparative volume of alternate cupfuls may be judged by the relative water levels in the buckets.

After the condensers 37 and 38 are fully charged, the charging action is somewhat modified from the above, since the diodes then act like peak rectifiers and only conduct on peak voltages exceeding the built-up charges. However, the sequence of charging and discharging is the same as for the first pair of pulses already described, and the effect is still to charge the condensers in opposition and in proportion to the pulse heights.

The net D.-C. voltage appearing across condensers 37 and 38 contains some ripple due to the slight leaking away of the charges through resistors 46 and 47, but resistor 52 and condensers 53 filter most of this out. The leaks 46 and 47 are not essential to rectification action except that they allow built-up voltages to die away at a reasonable rate if the signal pulses drop in amplitude. Resistor 45 is a leak which stabilizes the D.-C. voltage across diode 42.

The D.-C. voltage output appearing across condensers 53 is applied to the grids of the vacuum tubes 58 and 59 which may be type 12AX7. Cathode current from these tubes passes through the compensating coil 60 which is wound around the cores P₁ and P₂ in such a way that the magnetic field set up by the current in coil 60 opposes the ambient field. Thus the elements P₁P₂ operate at a low field value and the apparatus is, in effect, substantially a null device. Obviously, a large ambient field at elements P₁P₂ is not completely compensated, since there must be a signal in the amplifier to maintain the required compensating current. In practice, it has been found good operation for a field change of 1,000 gamma to result in a compensating effect of about 998 gamma, leaving a net field of about 2 gamma which is sufficient to actuate the amplifier circuit. Thus, the system has a high degree of inverse feedback.

Since the compensating current is almost equivalent to the applied field, it may be used, with a small correction, to actuate a recorder. In Figure 1, a number of precision resistors 61—65 are shown in series with the compensating coil. Arm 54 of a tap switch can be set at different contacts to pick off different amounts of voltage which are proportional to the compensating current. This voltage is fed to a potentiometric type of recorder (not shown) connected at 66. If a recorder of high sensitivity is used, it, of course, has a small voltage range, and it is necessary to buck out a substantial part of the voltage to put it on scale. When higher taps are used on switch 54, the sensitivity becomes higher and the amount of voltage to be bucked out increases. The buck-out circuit is not shown as it is part of the potentiometric recorder.

Certain of the components of the amplifier have already been identified in the foregoing description of its operation. The following table is given of operating values of the various components, but it is to be understood that the values given are by way of example only and other values which will result in equivalent operation may be employed as will be evident to those skilled in the art.

| Component: | | Value |
|---|---|---|
| B+ | volts | 210 |
| 15 | mfd | 0.5 |
| 16 | ohms | 680 |
| 17, 18 | megohms | 0.5 |
| 19 | volts | 1.5 |
| 28 | | 6AL5 |
| 29, 30 | | 12AU7 |
| 31, 32 | | 12AU7 |
| 37, 38 | mfd | 4.0 |
| 40 | mfd | 1.0 |
| 42, 44 | | 6AL5 |
| 43 | mfd | 0.5 |
| 45 | megohms | 2.2 |
| 46, 47 | do | 1.0 |
| 50, 70 | do | 0.1 |
| 52 | ohms | 27,000 |
| 53 | mfd | 4.0 |
| 55 | ohms | 4700 |
| 56 | mfd | 0.1 |
| 57 | megohm | 1.0 |
| 58, 59 | | 12AX7 |
| 61 | ohms | 266.66 |
| 62 | do | 133.33 |
| 63 | do | 66.66 |
| 64, 65 | do | 33.33 |
| 67 | megohms | .47 |
| 68 | mfd | .05 |
| 69 | ohms | 25,000 |
| 71, 73, 78 | megohms | 1.0 |
| 72 | mfd | 0.5 |
| 74 | mfd | .00003 |
| 75 | megohms | .22 |
| 76 | mfd | .05 |
| 77 | megohms | .47 |
| 80, 81, 83 | mfd | 4.0 |
| 82 | ohms | 6,800 |

While tube 30 has been described as changing the pulse-type signal of Figure 8 to a saw tooth wave as shown in Figure 9, the circuit of tube 30 could be made to change the signal to other wave forms, such as rectangular or sinusoidal. However, it is advantageous to distort the wave form as shown in Figure 10 so that the lower parts of the wave are cut off as shown by the horizontal segments at the base of the wave. The advantage of this arises partly from the fact that the switching then occurs on the horizontal base portions where the voltage is zero or at a minimum value. Thus, when the contacts 35 and 36 make and break, there is little or no voltage present and variations in the contact timing will have no effect on the indication.

It is also apparent to those skilled in the art that the vibrators may be replaced by electronic switches or gates which can function as reversing switches. Figures 13 to 15 show some alternative circuits in which rectifiers are used between the transformer 22 and the grid circuit of tube 29, the first synchronous vibrated switch comprising reed 24 with contacts 25 and 26 of Figure 1 being replaced by a pair of rectifiers having a very high forward-to-backward ratio, such as germanium junction-type rectifiers or diode vacuum tubes. In Figures 13 and 14 the transformer coil 22 is center tapped as in Figure 1, while in Figure 15 the two halves of transformer coil 22 are isolated from each other as shown. The bias battery 19 and resistors 17 and 18 of Figure 1 are retained in Figures 13 to 15. The tube 28 of Figure 1 is retained in Figure 13, but may be eliminated in the circuits of Figures 14 and 15 because in these circuits the rectifiers themselves take over the function of clipping the low-amplitude background or "hash." All of the circuits shown in Figures 13 to 15 as well as the corresponding part of Figure 1 will be recognized as full-wave rectifiers without any filtering action. In Figure 13 the diode rectifiers 85 and 86 connected as shown supply unidirectional pulses to the grid of tube 29. In Figure 14 the germanium junction-type rectifiers 87 and 88 perform a similar function. In Figure 15, diode rectifiers 89 and 90, together with bias battery 19, are connected in the ground side of the two coils of transformer 22, and their rectification results in unidirectional pulses at the grid of tube 29. The pairs of rectifiers may be of various types, e. g., diodes, germanium junctions, etc., and may be used interchangeably in the circuits of Figures 13 to 15 provided the rectifiers have a low-forward resistance, together with a high-backward resistance, and low-noise level. When diodes are used to replace the vibrator (24, 25, 26) the diodes must be highly stable. We have found the vibrator to be highly stable and usable in magnetometers of the highest sensitivity.

Our invention is also applicable to flux-valve gradiometers which differs from the foregoing only in that the elements $P_1$ and $P_2$ are spaced apart, reversed in direction with respect to each other, and provided with properly-polarized individual compensating windings. Our invention may also be used in the output circuit of orientation-controlling flux-valves in a magnetometer or gradiometer.

What we claim as our invention is:

1. In a magnetic detector of the unbalanced flux-valve type which produces output pulses of alternating polarity, means for comparing amplitudes of alternate pulses of opposite polarity which comprises a switch connected to the flux-valve output circuit and operating in synchronism with the flux-valve excitation and adapted to reverse alternate pulses so that all pulses will have like polarity, a single-ended amplifier connected to said switch and adapted to amplify the flux-valve output pulses, a pair of filter elements, a second switch connected to the amplifier output and operating in synchronism with the flux-valve excitation and adapted to deliver alternate pulses respectively to said filter elements, and means responsive to the difference between the voltage of said filter elements.

2. In a magnetic detector of the unbalanced flux-valve type which produces output pulses of alternating polarity, means for comparing amplitudes of alternate pulses of opposite polarity which comprises an unfiltered full-wave rectifier connected to the output of the flux-valve, a single-ended amplifier connected to the output of said rectifier and adapted to amplify the flux-valve output pulses, a pair of filter elements, a switch connected to the amplifier output and operating in synchronism with the flux-valve excitation and adapted to deliver alternate pulses respectively to said filter elements, and means responsive to the difference between the voltages of said filter elements.

3. In a magnetic detector of the unbalanced flux-valve type which produces output pulses of alternating polarity, means for comparing amplitudes of alternate pulses of opposite polarity which comprises a reversing switch synchronized with the flux-valve excitation frequency and phased to reverse alternate pulses without change, a single-ended amplifier connected to the flux-valve through said reversing switch, a second reversing switch connected to the output of said amplifier and synchronized with the flux-valve excitation frequency and phased to reverse alternate amplified pulses without change, and a two-section differential filter circuit connected to the reversing switch so that alternately-phased pulses respectively charge two sections of said differential filter circuit in opposition.

4. In a magnetic detector of the unbalanced flux-valve type which produces output pulses of alternating polarity, means for comparing amplitudes of alternate pulses of opposite polarity which comprises a single-ended amplifier, means including a first synchronous switch which reverses the polarity of alternate pulses connecting said amplifier to the flux-valve, means in said amplifier to block passage of pulses below a predetermined amplitude, means in said amplifier to broaden the transmitted pulses, a pair of condensers, means including a second synchronous switch connecting the amplifier alternately to said two condensers whereby alternate pulses are delivered respectively to said condensers, means to combine in opposition the voltages accumulated on said condensers, and means responsive to the differential voltage of said condensers.

5. A differential pulse rectifier circuit for producing in a single-ended grounded circuit a direct-current output voltage indicative of the relative amplitudes of alternate pulses from a single-ended grounded pulse-supplying circuit which comprises a coupling means having its first terminal connected to the pulse-supplying circuit, an ungrounded rectifier having its first terminal connected to the second terminal of said coupling means, a single-pole-double-throw switch having its pole connected to the second terminal of said rectifier, two condensers each having its first terminal connected respectively to one throw of said switch and having their second terminals connected to a common point, means to operate said switch in synchronism with said pulse-supplying circuit and in such phase as to deliver alternate pulses respectively to said condensers, a second rectifier having its first terminal of the same polarity as the first terminal of the first rectifier and connected to said common point and its second terminal connected to the junction between said coupling means and said first rectifier, and a grounded direct-current utilization circuit connected to the first terminals of said condensers.

(References on following page)

References Cited in the file of this patent

UNITED STATES PATENTS

| | | |
|---|---|---|
| 2,208,349 | Ulbricht | July 16, 1940 |
| 2,449,517 | Stout et al. | Sept. 14, 1948 |

OTHER REFERENCES

Review of Scientific Instruments, vol. 22, "A Phase Sensitive Detector, etc.," by Schuster, pages 254, 255. Pub. date April 1951.